(12) United States Patent  (10) Patent No.: US 8,117,144 B2
Angell et al.  (45) Date of Patent: Feb. 14, 2012

(54) GENERATING PREDILECTION COHORTS

(75) Inventors: Robert Lee Angell, Salt Lake City, UT (US); Robert R Friedlander, Southbury, CT (US); James R Kraemer, Santa Fe, NM (US)

(73) Assignee: Nuance Communications, Inc., Burlington, MA (US)

( * ) Notice: Subject to any disclaimer, the term of this patent is extended or adjusted under 35 U.S.C. 154(b) by 705 days.

(21) Appl. No.: 12/333,323

(22) Filed: Dec. 12, 2008

(65) Prior Publication Data

US 2010/0153353 A1   Jun. 17, 2010

(51) Int. Cl.
G06N 5/00 (2006.01)
(52) U.S. Cl. ........................................................ 706/45
(58) Field of Classification Search ..................... 706/45
See application file for complete search history.

(56) References Cited

OTHER PUBLICATIONS

Lymberopoulos, et al, An Easy-to-Program Sensor System for Parsing Out Human Activities, Embedded Networks and Applications Lab, ENALAB, Yale Univerisity, New Haven, CT, 2008, pp. 1-17.*
U.S. Appl. No. 12/336,471, filed Dec. 16, 2008, Angell et al.
U.S. Appl. No. 12/336,488, filed Dec. 16, 2008, Angell et al.
U.S. Appl. No. 12/277,122, filed Nov. 24, 2008, Angell et al.
U.S. Appl. No. 12/333,311, filed Dec. 12, 2008, Angell et al.
U.S. Appl. No. 12/333,316, filed Dec. 12, 2008, Angell et al.
U.S. Appl. No. 12/275,830, filed Nov. 21, 2008, Angell et al.
U.S. Appl. No. 12/335,731, filed Dec. 16, 2008, Angell et al.
U.S. Appl. No. 12/336,440, filed Dec. 16, 2008, Angell et al.
Brown et al., "IBM Smart Surveillance System (S3): An Open and Extensible Architecture for Smart Video Surveillance", Retrieved on Jan. 12, 2009, pp. 1-4.
Brown et al., "IBM Smart Surveillance System (S3): An Open and Extensible Architecture for Smart Video Surveillance", Retrieved on Jan. 12, 2009, pp. 1-4.

* cited by examiner

*Primary Examiner* — Wilbert L Starks
(74) *Attorney, Agent, or Firm* — Wolf, Greenfield & Sacks, P.C.

(57) ABSTRACT

A computer implemented method, apparatus, and computer program product for generating risk scores for specific risk cohorts. Digital sensor data associated with a specific risk cohort is received from a set of multimodal sensors. The specific risk cohort includes a set of identified cohort members. The digital sensor data includes metadata describing attributes associated with at least one cohort member in the set of identified cohort members. Description data for each cohort member in the set of identified cohort members is retrieved to form a set of cohort description data. The description data for each cohort member comprises data describing a previous history of the cohort member or a current status of the cohort member. The cohort member is a person, animal, plant, thing, or location. A specific risk score is generated for the specific risk cohort based on selected risk factors, the attributes associated with the at least one identified member, and the set of cohort description data. A response action is initiated in response to a determination that the specific risk score exceeds a risk threshold.

20 Claims, 5 Drawing Sheets

US 8,117,144 B2

GENERATING PREDILECTION COHORTS

BACKGROUND OF THE INVENTION

1. Field of the Invention

The present invention relates generally to an improved data processing system and in particular to a method and apparatus for generating cohorts. More particularly, the present invention is directed to a computer implemented method, apparatus, and computer usable program code for generating a predilection cohort and identifying a predilection score for the predilection cohort.

2. Description of the Related Art

A predilection is the tendency or inclination to take an action or refrain from taking an action. A cohort is a group of people, animals, plants, places, or objects that share a common attribute or experience. For example, a group of people born in 1980 may form a birth cohort. A cohort may include one or more sub-cohorts. For example, the birth cohort of people born in 1980 may include a sub-cohort of people born in 1980 in Salt Lake City, Utah. A sub-sub-cohort may include people born in 1980 in Salt Lake City, Utah to low income, single parent households.

Cohorts are frequently generated based on one or more attributes of the members of each cohort. The information used to identify the attributes of members of a cohort is typically provided by the members of the cohort. However, information describing attributes of members of a cohort may be voluminous, dynamically changing, unavailable, difficult to collect, and/or unknown to the member of the cohort and/or the user selecting members of a cohort. Moreover, it may be difficult, time consuming, or impractical for an individual to access all the information necessary to accurately generate cohorts. Thus, unique cohorts may be sub-optimal because individuals lack the skills, time, knowledge, and/or expertise needed to gather cohort attribute information from available sources.

BRIEF SUMMARY OF THE INVENTION

According to one embodiment of the present invention, a computer implemented method, apparatus, and computer program product for generating a predilection score is provided. The process receives digital sensor data associated with a predilection cohort from a set of multimodal sensors. The predilection cohort comprises an identified member of the predilection cohort. The digital sensor data comprises metadata describing attributes of the identified member. The digital sensor data is processed and parsed using a set of data models to identify a set of events associated with the predilection cohort. An inference engine analyzes the set of events and description data for the identified member to generate a predilection score. The inference engine analyzes the set of events and the description data using a rule set. The predilection score indicates a probability of a future occurrence of the potential action being performed by the identified cohort member. In response to a determination that the predilection score exceeds a threshold, the potential action is identified as an action that is likely to occur.

DETAILED DESCRIPTION OF THE INVENTION

Figure 1:
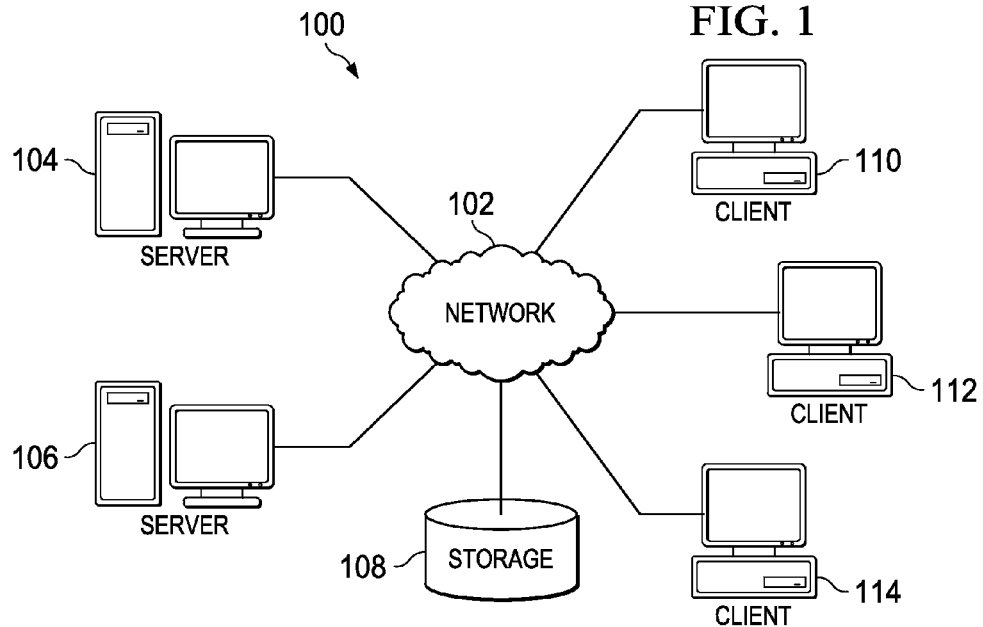
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
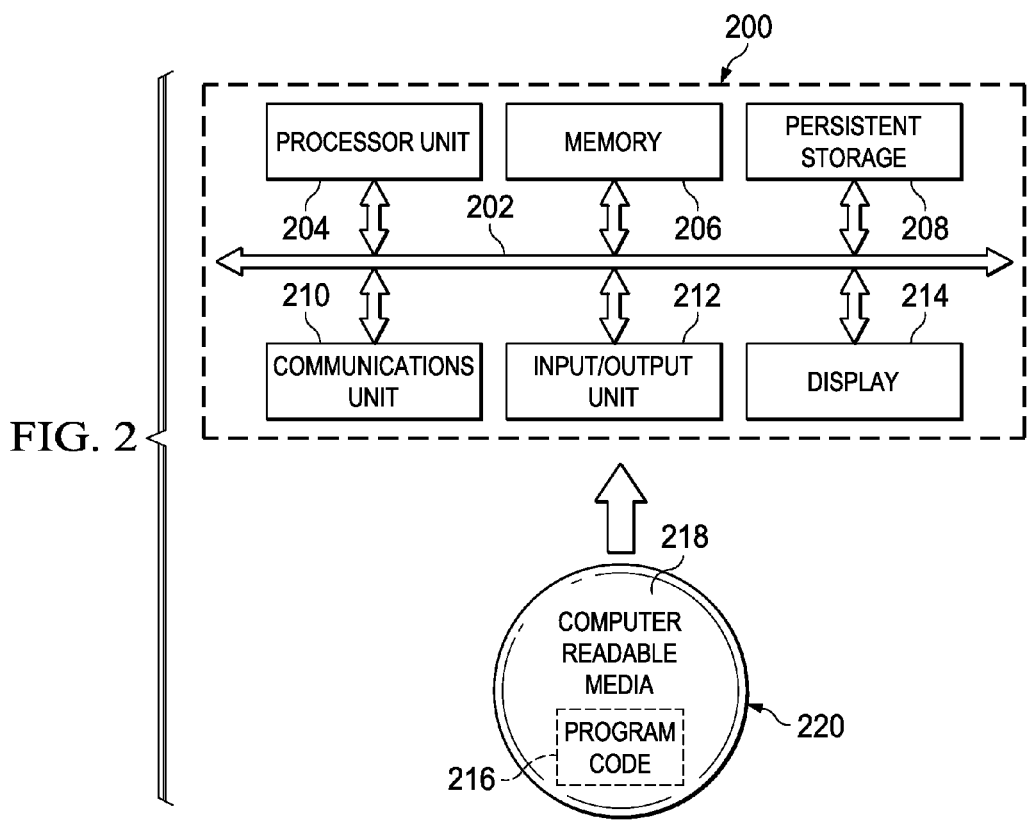
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as, without limitation, server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. A memory may be, for example, memory 206 or a cache such as found in an interface and memory controller hub that may be present in communications fabric 202.

A predilection is the tendency or inclination to take an action or refrain from taking an action. A probability assessment is the determination of a probability value. The probability value is a quantitative or qualitative value of the chance associated with a particular predilection given a set of circumstance. For example, and without limitation, a person's predilection to open an umbrella while outside increases as the amount of rainfall increases. Likewise, a person's predilection to purchase a turkey increases, as Thanksgiving Day gets closer.

The illustrative embodiments recognize that the ability to quickly and accurately perform probability assessment to calculate the likelihood that a person will perform a particular action, refrain from performing an action, or cease performing an action that the person is currently engaged in may be valuable to business planning, hiring employees, health, safety, future purchases, marketing, and various other industries.

According to one embodiment of the present invention, a computer implemented method, apparatus, and computer program product for generating a predilection score is provided. The process receives digital sensor data associated with a predilection cohort from a set of multimodal sensors. As used herein, the term "set" refers to one or more, unless specifically defined otherwise. Thus, the set of multimodal sensors may include a single multimodal sensor, as well as two or more multimodal sensors. The predilection cohort includes a set of cohort members. A member of a cohort may be a person, place, thing, animal, or plant.

The predilection cohort comprises an identified member of the predilection cohort. The digital sensor data comprises metadata describing attributes of the identified member. The digital sensor data is processed and parsed using a set of data models to identify a set of events associated with the predilection cohort. An inference engine analyzes the set of events and description data for the identified member to generate a predilection score. The inference engine analyzes the set of events and the description data using a rule set. The predilection score indicates a probability of a future occurrence of the potential action being performed by the identified cohort member. In response to a determination that the predilection score exceeds a threshold, the potential action is identified as an action that is likely to occur.

Figure 3:
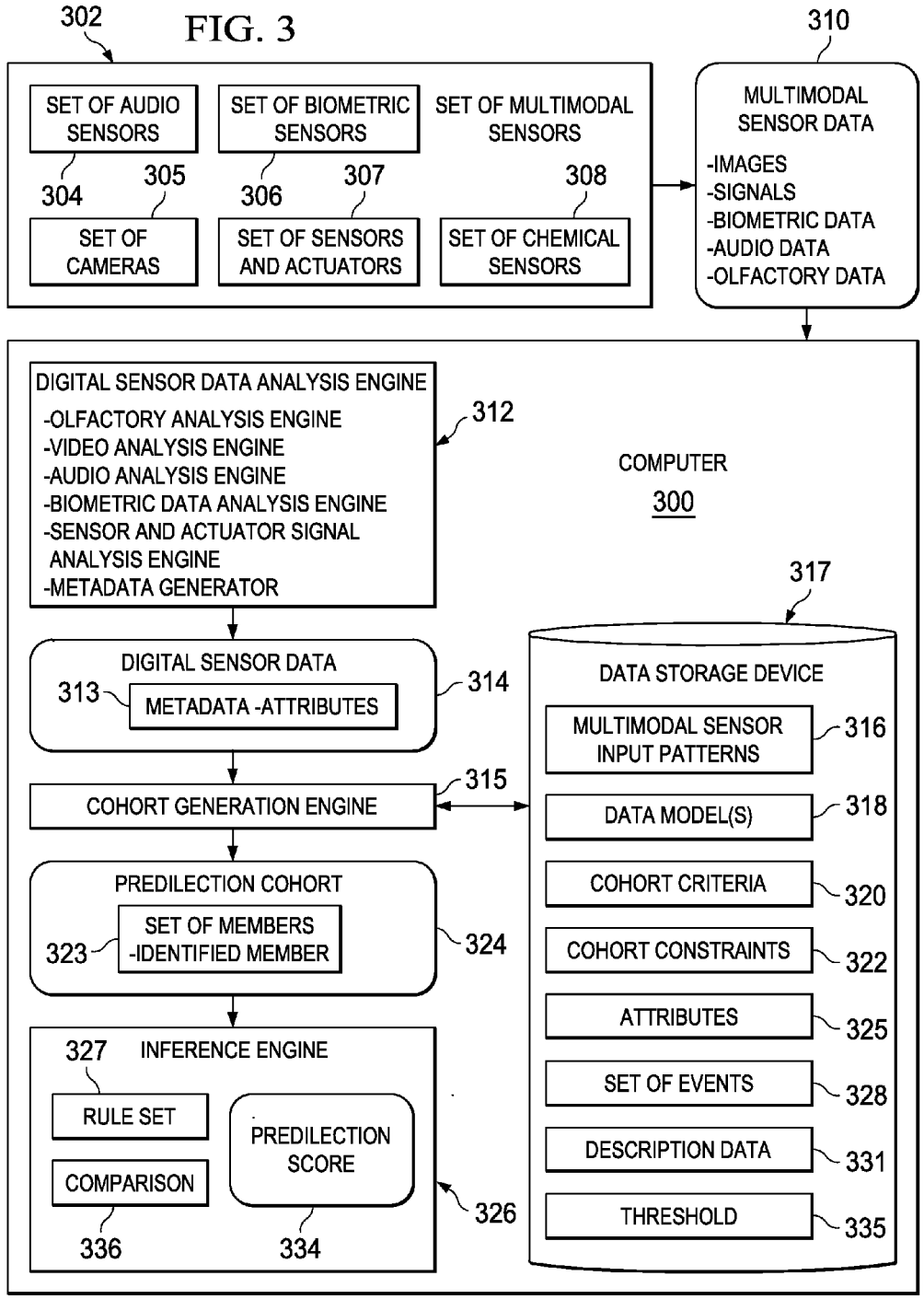
FIG. 3 is a block diagram of a predilection cohort generation system in accordance with an illustrative embodiment.

FIG. 3 is a block diagram of predilection cohort generation system in accordance with an illustrative embodiment. Computer 300 may be implemented using any type of computing device, such as, but not limited to, a main frame, server, a personal computer, laptop, personal digital assistant (PDA), or any other computing device depicted in FIGS. 1 and 2. Set of multimodal sensors 302 is a set of sensors that gather sensor data associated with a set of objects. An object may be a person, animal, plant, location, or thing. For example, and without limitation, set of multimodal sensors 302 may include a camera that records images of pedestrians walking on a public sidewalk. In this example, the multimodal sensor is a camera and the set of objects may include the pedestrians, dogs, cats, birds, squirrels, or other animals on the sidewalk, the sidewalk itself, the grass on either side of the sidewalk, the trees overhanging the sidewalk, water fountains, balls, or any other things associated with the sidewalk.

In this non-limiting example, set of multimodal sensors 302 includes set of audio sensors 304, set of cameras 305, set of biometric sensors 306, set of sensors and actuators 307, set of chemical sensors 308, and any other types of devices for gathering data associated with a set of objects and transmitting that data to computer 300. The term "set" refers to one or more items. Thus, set of multimodal sensors 302 may include a single sensor, as well as two or more sensors. A set of multimodal sensors detect, capture, and/or record multimodal sensor data 310.

Set of audio sensors 304 is a set of audio input devices that detect, capture, and/or record vibrations, such as, without limitation, pressure waves and sound waves. Vibrations may be detected as the vibrations are transmitted through any medium, such as, a solid object, a liquid, a semisolid, or a gas, such as the air or atmosphere. Set of audio sensors 304 may include only a single audio input device, as well as two or more audio input devices. An audio sensor in set of audio sensors 304 may be implemented as any type of device that can detect vibrations transmitted through a medium, such as, without limitation, a microphone, a sonar device, an acoustic identification system, or any other device capable of detecting vibrations transmitted through a medium.

Set of cameras 305 may be implemented as any type of known or available camera(s), including, but not limited to, a video camera for generating moving video images, a digital camera capable of taking still pictures and/or a continuous video stream, a stereo camera, a web camera, and/or any other imaging device capable of capturing a view of whatever appears within the camera's range for remote viewing, or recording of an object or area. Various lenses, filters, and other optical devices such as zoom lenses, wide-angle lenses, mirrors, prisms, and the like, may also be used with set of cameras 305 to assist in capturing the desired view. A camera may be fixed in a particular orientation and configuration, or it may, along with any optical devices, be programmable in orientation, light sensitivity level, focus or other parameters.

Set of cameras 305 may be implemented as a stationary camera and/or non-stationary camera. A stationary camera is in a fixed location. A non-stationary camera may be capable of moving from one location to another location. Both a stationary and non-stationary camera may be capable of tilting in one or more directions, such as up, down, left, right, panning, and/or rotating about an axis of rotation to follow or track a person, animal, or object in motion or keep a mobile object, such as, without limitation, a person, animal, or vehicle, within a viewing range of the camera lens.

Set of biometric sensors 306 is a set of one or more devices for gathering biometric data associated with a human or an animal. Biometric data is data describing a physiological state, physical attribute, or measurement of a physiological condition. Biometric data may include, without limitation, fingerprints, thumbprints, palm prints, footprints, hear rate, retinal patterns, iris patterns, pupil dilation, blood pressure, respiratory rate, body temperature, blood sugar levels, and any other physiological data. Set of biometric sensors 306 may include without limitation, fingerprint scanners, palm scanners, thumb print scanners, retinal scanners, iris scanners, wireless blood pressure gauge, heart monitor, thermometer or other body temperature measurement device, blood sugar monitor, microphone capable of detecting heart beats and/or breath sounds, a breathalyzer, or any other type of biometric device.

Set of sensors and actuators 307 is a set of devices for detecting and receiving signals from devices transmitting signals associated with the set of objects. Set of sensors and actuators 307 may include, without limitation, radio frequency identification (RFID) tag readers, global positioning system (GPS) receivers, identification code readers, network devices, and proximity card readers. A network device is a wireless transmission device that may include a wireless personal area network (PAN), a wireless network connection, a radio transmitter, a cellular telephone, Wi-Fi technology, Bluetooth technology, or any other wired or wireless device for transmitting and receiving data. An identification code reader may be, without limitation, a bar code reader, a dot code reader, a universal product code (UPC) reader, an optical character recognition (OCR) text reader, or any other type of identification code reader. A GPS receiver may be located in an object, such as a car, a portable navigation system, a personal digital assistant (PDA), a cellular telephone, or any other type of object.

Set of chemical sensors 308 may be implemented as any type of known or available device that can detect airborne chemicals and/or airborne odor causing elements, molecules, gases, compounds, and/or combinations of molecules, elements, gases, and/or compounds in an air sample, such as, without limitation, an airborne chemical sensor, a gas detector, and/or an electronic nose. In one embodiment, set of chemical sensors 308 is implemented as an array of electronic olfactory sensors and a pattern recognition system that detects and recognizes odors and identifies olfactory patterns associated with different odor causing particles. The array of electronic olfactory sensors may include, without limitation, metal oxide semiconductors (MOS), conducting polymers (CP), quartz crystal microbalance, surface acoustic wave (SAW), and field effect transistors (MOSFET). The particles detected by set of chemical sensors may include, without limitation, atoms, molecules, elements, gases, compounds, or any type of airborne odor causing matter. Set of chemical sensors 308 detects the particles in the air sample and generates olfactory pattern data in multimodal sensor data 310. Multimodal sensor data 310 may be in an analog format or in a digital format.

Digital sensor data analysis engine 312 is software architecture for processing multimodal sensor data 310 to identify attributes of the set of objects, convert any multimodal sensor data 310 that is in an analog format into a digital format, and generate metadata describing the attributes to form digital sensor data 314. Multimodal sensor data 310 may include sensor input in the form of audio data, images from a camera, biometric data, signals from sensors and actuators, and/or olfactory patterns from an artificial nose or other chemical sensor. Therefore, digital sensor data analysis engine 312 includes a variety of software tools for processing and analyzing these different types of multimodal sensor data.

In FIG. 3, digital sensor data analysis engine 312 includes, without limitation, olfactory analysis engine for analyzing olfactory sensory data received from set of chemical sensors 308, a video analysis engine for analyzing images received from set of cameras 305, an audio analysis engine for analyzing audio data received from set of audio sensors 304, biometric data analysis engine for analyzing biometric sensor data from set of biometric sensors 306, sensor and actuator signal analysis engine for analyzing sensor input data from set of sensors and actuators 307, and a metadata generator for generating metadata describing the attributes of the set of objects. The video analysis system may be implemented using any known or available software for image analytics, facial recognition, license plate recognition, and sound analysis. In this example, video analysis system is implemented as IBM® smart surveillance system (S3) software.

Digital sensor data 314 comprises metadata 313 describing attributes of at least one identified member of predilection cohort 324. An attribute is a characteristic, feature, or property of an object. In a non-limiting example, an attribute may include a person's name, address, eye color, age, voice pattern, color of their jacket, size of their shoes, speed of their walk, length of stride, marital status, identification of children, make of car owned, and so forth. Attributes of a thing may include the name of the thing, the value of the thing, whether the thing is moving or stationary, the size, height, volume, weight, color, or location of the thing, and any other property or characteristic of the thing.

Digital sensor data analysis engine 312 also processes and parses digital sensor data 314 using a set of data models and/or analysis engines to identify a set of events associated with predilection cohort 324. In this example, digital sensor data analysis engine 312 includes software architecture for identifying events associated with members of predilection cohort 324 based on an analysis of digital sensor data 314.

In this non-limiting example, digital sensor data analysis engine 312 optionally includes, without limitation, behavior analysis technology, license plate recognition, facial recognition technology, badge reader technology, and radar analytic technology. Behavior analysis technology tracks moving objects and classifies the objects into a number of predefined categories by analyzing metadata describing images captured by the cameras. As used herein, an object may be a human, an object, a container, a cart, a bicycle, a motorcycle, a car, a location, or an animal, such as, without limitation, a dog. License plate recognition technology may be utilized to analyze images captured by cameras deployed at the entrance to a facility, in a parking lot, on the side of a roadway or freeway, or at an intersection. License plate recognition technology catalogs a license plate of each vehicle moving within a range of two or more video cameras. For example, license plate recognition technology is utilized to identify a license plate number on license plate.

Facial recognition technology is software for identifying a human based on an analysis of one or more images of the human's face. Facial recognition technology may be utilized to analyze images of objects captured by cameras deployed at entryways, or any other location, to capture and recognize faces. Badge reader technology may be employed to read badges. The information associated with an object obtained from the badges is used in addition to video data associated with the object to identify an object and/or a direction, velocity, and/or acceleration of the object. The data gathered from behavior analysis technology, license plate recognition technology, facial recognition technology, badge reader technology, radar analytics technology, and any other video/audio data received from a camera or other video/audio capture device is received for processing into set of events 328 and/or attributes 325 describing at least one member of predilection cohort 324. The events from all these technologies may be cross indexed into a common repository or a multi-mode event database allowing for correlation across multiple audio/video capture devices and event types. In such a repository, a simple time range query across the modalities will extract license plate information, vehicle appearance information, badge information, object location information, object position information, vehicle make, model, year and/or color, and facial appearance information.

Digital sensor data analysis engine 312 may include metadata ingestion web services (analytics) and event query web services analytics, which provides infrastructure for indexing, retrieving, and managing set of events 328 and metadata 313 describing attributes 325. Each analytics engine can generate real-time alerts and generic event metadata. The metadata generated by the analytics engines may be represented using, for example and without limitation, extensible markup language (XML). Each event may include a reference to the original source of the multimodal sensor data used to identify the event, such as, without limitation, a link to the video file that the video data is stored on and/or identification of the camera in set of cameras that generated the video data.

Cohort generation engine 315 receives digital sensor data 314 from digital sensor data analysis engine 312. Cohort generation engine 315 may request digital sensor data 314 from digital sensor data analysis engine 312 or retrieve digital sensor data 314 from data storage device 317. In another embodiment, digital sensor data analysis engine 312 automatically sends digital sensor data 314 to cohort generation engine 315 in real time as digital sensor data 314 is generated. In yet another embodiment, digital sensor data analysis engine 312 sends digital sensor data 314 to cohort generation engine 315 upon the occurrence of a predetermined event, such as a given time, completion of processing multimodal sensor data 310, occurrence of a timeout event, a user request for generation of set of cohorts based on digital sensor data 314, or any other predetermined event. Thus, the illustrative embodiments may utilize digital sensor data 314 in real time as digital sensor data 314 is generated or utilize digital sensor data 314 that is pre-generated or stored in a data storage device until the digital sensor data is retrieved at some later time.

Cohort generation engine 315 utilizes attributes identified in digital sensor data 314 to generate predilection cohort 324. Cohort generation engine 315 may utilize at least one of multimodal sensor input patterns 316, data model(s) 318, cohort criteria 320, and cohort constraints 322 to process the attributes and select set of members 323 for predilection cohort 324. As used herein, the term "at least one of", when used with a list of items, means that different combinations of one or more of the items may be used and only one of each item in the list may be needed. For example, "at least one of item A, item B, and item C" may include, for example, without limitation, item A alone, item B alone, item C alone, a combination of item A and item B, a combination of item B and item C, a combination of item A and item C, or a combination that includes item A, item B, and item C.

Multimodal sensor input patterns 316 are known multimodal sensor patterns resulting due to different combinations of multimodal sensor input in different environments. Each different type of sensor data and/or combination of sensor data in a particular environment creates a different sensor data pattern. When a match is found between known sensor patterns and some of the received sensor data, the matching pattern may be used to identify attributes of a particular set of objects.

For example, and without limitation, a pattern of sensor data may indicate that a person is well off or likely to spend a lot of money at a retail store if a signal is received from an iPhone™ cellular telephone associated with the person, a signal is received from an RFID tag identifying the person's clothing and shoes as expensive designer clothing, and a signal is received from a GPS receiver and a signal is received from a navigation system in a car owned by the person. In addition, a signal is received from a microchip implant in a dog that is owned by the person. The sensor data that are received from the person, the car, and the dog that is owned by the person creates a pattern that suggests the person is a consumer may be a person with a high income and/or a tendency to purchase expensive or popular and technology.

Cohort generation engine 315 may also utilize manual user input to generate predilection cohort 324. In other words, a user may manually select parameters used by cohort generation engine 315 to select members of predilection cohort 324 or a user may manually select the members of predilection cohort 324. Predilection cohort 324 is a cohort that includes at least one identified member. Thus, predilection cohort 324 comprises at least one of an identified person, identified animal, identified plant, identified location, or identified thing. An identified cohort member has description data describing the identified cohort member's past history and/or current status. The past history may include previous conditions of the cohort member, previous procedures or events associated with the cohort member. Current status includes, without limitation, current condition, current state, identification information, current location, or any other current information. Identification information may include names, addresses, age, Universal Product Code (UPC), license plate number, serial numbers, identification numbers, or any other identifiers.

Inference engine 326 is a computer program that derives inferences from a knowledge base. In this example, inference engine 326 derives inferences from cohort data generated by cohort generation engine 315, digital sensor data 314, attributes 325, and/or any other data available in the knowledge base. The data in the knowledge base may include data located in data storage device 317 as well as data located on one or more remote data storage devices that may be accessed using a network connection. Inference engine 326 also retrieves description data 331 for the identified member of predilection cohort. Description data 331 is data describing the previous history of the identified member, the current status of the identified member, and/or identification data for the identified member. The previous history includes information describing past events associated with the identified cohort member. Current status describes the current state or current attributes of the cohort member. The identification data is data identifying the cohort member, such as, without limitation, name, address, age, identification of spouse, identification of children, phone number, email address, contact information, business address, profession, serial numbers, license plate numbers, driver license number, or any other identification information.

Inferences are conclusions regarding the chance or probability of the occurrence of a potential action. The potential action is an event or action that is done or engaged in by the identified cohort member. For example, the potential action may be the possibility that an identified cohort member Robert Rose will take his dog for a walk in Central Park on Saturday morning. In another non-limiting example, the potential action may be the predilection of a predilection cohort member Jane, who is a mother of 3 children under the age of ten, will purchase the new Elmo toy this Christmas season. Inference engine 326 determines a predilection score 334 that indicates the predilection of the identified cohort member to engage in the potential action based on attributes 325, set of events 328, description data 331, and inferences that are drawn or inferred based on current facts, set of rules 327, information in the knowledge base, digital sensor data 314.

Rule set 327 specifies information to be searched, using queries, data mining, or other search techniques. For example, if predilection cohort 324 requires a probability that a patient named Betty Brant will require a stronger antibiotic prescription following surgery to remove her appendix than is typically prescribed to patients, rule set 327 may specify searching for past history of infections for Betty Brant and for other patients in Betty Brant's age demographic group having the same surgery. Rule set 327 may also specify certain interrelationships between data sets that will be searched. Inference engine 326 uses data in a centralized database to derive inference(s) and calculate probabilities of events based on comparison of available data according to rule set 327.

Inference engine 326 calculates a predilection score 332 based on set of events 328, description data 331, attributes 325, and rule set 327. Comparison 336 is a software component that compares predilection score 334 to threshold 335. Threshold 335 may be a threshold that is determined a priori, such as a default threshold. Threshold 335 may also be determined on an iterative convergence factor, such as, without limitation, 0.02.

If predilection score 334 does not exceed an upper risk threshold or fall below a lower risk threshold, then inference engine 326 continues to listen for new digital sensor data 314 from set of multimodal sensors 302. Inference engine 326 continues to update predilection score 334 in response to changes in events and attributes indicated by changes in incoming digital sensor data 314 and changes in manual input received from a user. In response to a determination that predilection score 334 exceeds an upper threshold or falls below a lower risk threshold, then inference engine 326 presents a notification to a user indicating that the predilection score exceeds the threshold and/or notifying the user that the potential action is likely to be performed by the identified cohort member.

Figure 4:
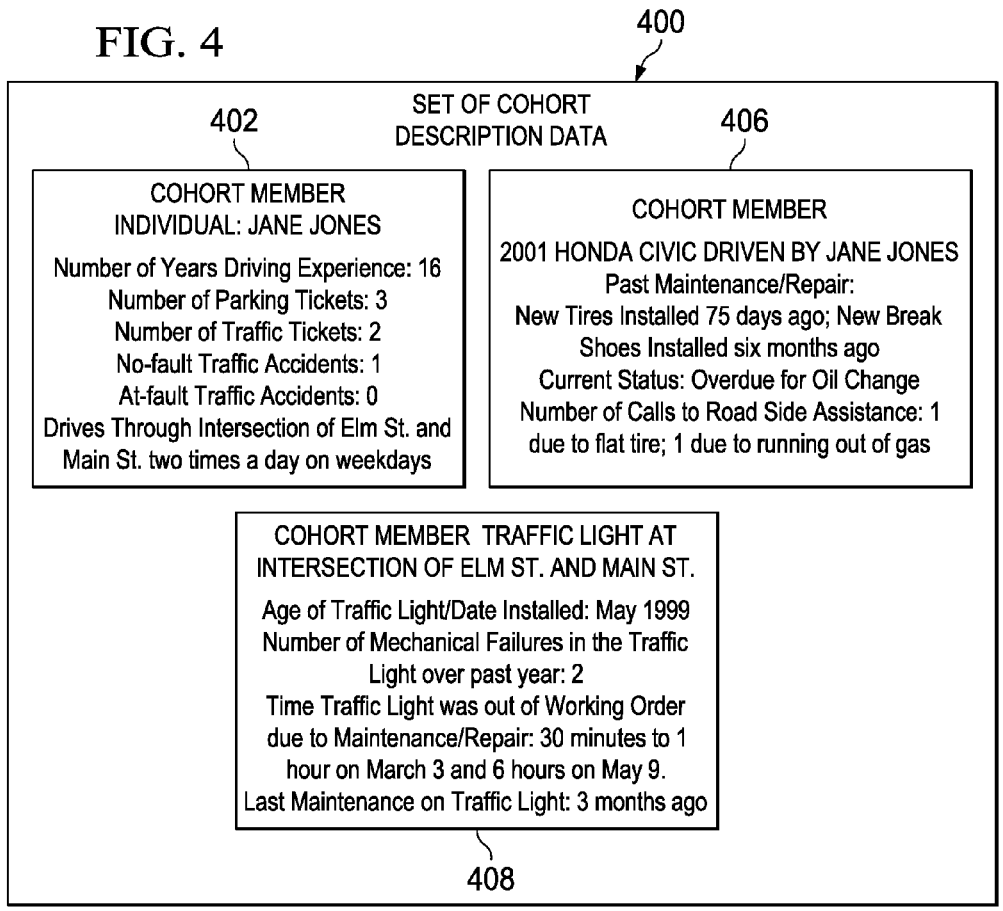
FIG. 4 is a block diagram of a set of cohort description data in accordance with an illustrative embodiment.

Referring now to FIG. 4, a block diagram of a set of cohort description data is depicted in accordance with an illustrative embodiment. Set of cohort description data 400 includes description data for members of a cohort, such as a predilection cohort. In one non-limiting example, a driving-related predilection cohort includes cohort member 402 that is an individual named Jane Jones and cohort member 406 that is a 2001 Honda Civic driven by Jane Jones, and cohort member 408 that is a traffic light at the intersection of Elm Street and Main Street.

Each cohort member in the predilection cohort has description data in set of cohort description data 400. The description data for each cohort member describes the past history of the cohort member and/or the current status of the cohort member. For example, and without limitation, the description data for cohort member 402 Jane Jones may include Jane Jones past driving history, her number of years of driving experience, the number of parking tickets she received, the number of traffic tickets she received, the number of traffic accidents Jane Jones was involved in, whether Jane Jones was at fault for the traffic accidents she was involved in, and how frequently she drives through the intersection of Elm Street and Main Street. The description data may also include the current status of Jane Jones, for example, whether her drivers' license is current and valid, and other current status information for Jane Jones.

The description data for cohort member 406 may include the past maintenance and repairs of the car, previous vehicle breakdowns, and other past incidents involving the car. The current status may include any currently due maintenance or repairs, current condition of tires, or other current status data. The description data for cohort member 406 may include, without limitation, the past history of the traffic light's mechanical failures, maintenance, installation, replacement parts, length of past repairs, and other historical data for the cohort member. The current status may include, without limitation, whether the traffic light is due for maintenance, currently operating normally, or other current status data.

The cohort members and description data shown in FIG. 4 is only an example of possible cohort members and description data. The embodiments are not limited to the cohort members and description data shown in FIG. 4. For example, and without limitation, a cohort member may include a hospital patient named Sally Smith. The description data for Sally Smith may include her past medical history, previous illnesses, previous surgeries she received, illnesses and medical conditions previously diagnosed, allergies, previous physicians, and any other past history information. The current status description data may include her current medical condition, her current vital signs, her current medications and prescriptions, her current physicians, her age, her address, and any other current information for Sally Smith.

Figure 5:
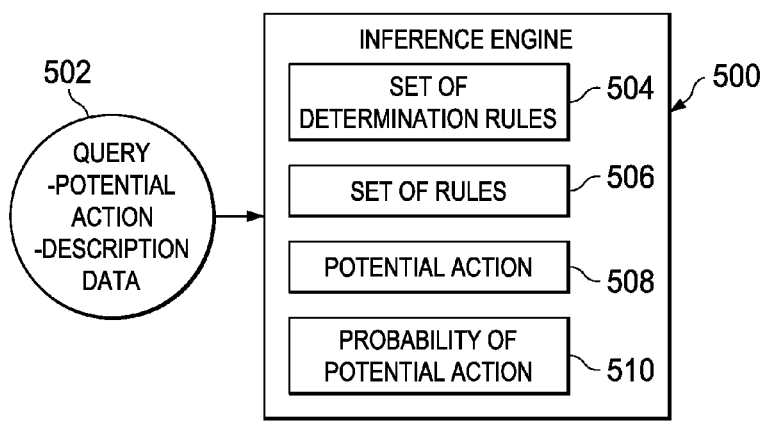
FIG. 5 is a block diagram of an inference engine in accordance with an illustrative embodiment.

FIG. 5 is a block diagram illustrating an inference engine in accordance with an illustrative embodiment. Inference engine 500 is a software component for generating inferences and probabilities of inferences using medical data associated with a target individual, such as inference engine 326 in FIG. 3.

Query 502 is a request for a fact, such as probable medications and/or treatments that may be required by a target individual. Query 502 may be a single query or a set of two or more queries. In response to receiving query 502, inference engine 500 uses query 502 as a frame of reference to find relevant information in a data storage or central database. A frame of reference is an anchor datum or set of data that is used to limit which data are searched in the central database. The frame of reference is used to establish set of determination rules 504.

Set of determination rules 504 is a set of rules that are used to generate set of rules 506. Set of rules 506 specifies information to be searched. For example, if query 502 requests probable antibiotics that may be needed, set of rules 506 may specify searching for past history of infections in the target individual that required antibiotics. Set of determination rules 504 may also specify certain interrelationships between data sets that will be searched. Inference engine 500 uses data in a centralized database to derive potential action 508 that may be performed by the subject and probability of the potential action 510 being taken by the subject. The potential action 508 may be an action to be taken by the subject, a current action that will cease, or an action that the subject will refrain from engaging in. Inference engine 500 does not compare the entirety of the data in the central database with every possible combination in order that limited computing resources can execute desired queries.

The central database is a database for storing target data associated with a target individual, such as, without limitation, a data storage device, such as storage 108 in FIG. 1. The central database stores any data associated with the target attribute and/or cohort groups. Potential action 508 is an inference generated by inference engine 500. Potential action 508 includes an inference regarding a possible future occurrence of a specific action given a specific set of circumstances occurring in the given environment surrounding the identified subject. The inferences may be true or false. A probability of the potential action 510 occurring indicates the likelihood or percentage chance that the subject will engage in the action.

Figure 6:
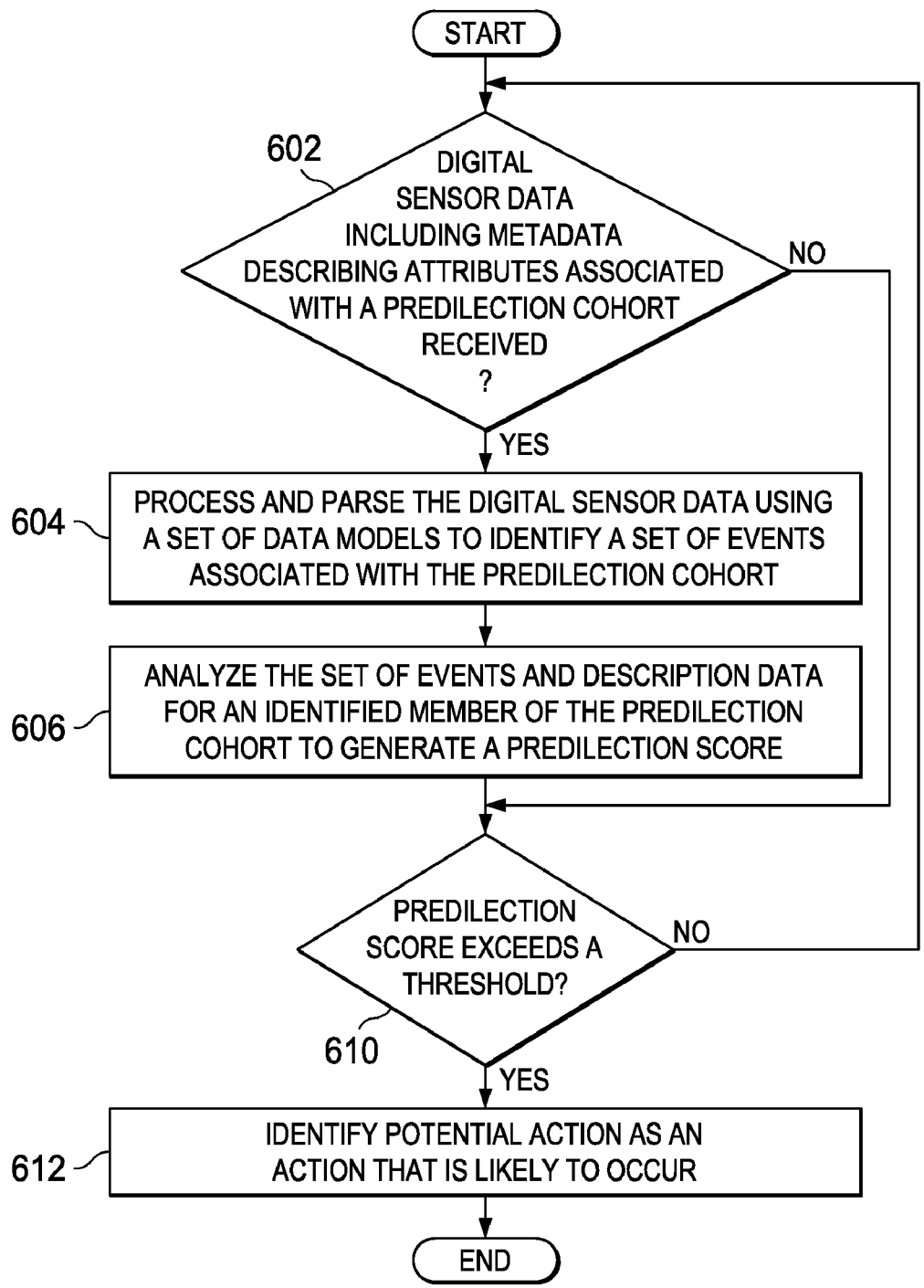
FIG. 6 is a flowchart of a process for generating a predilection score for a predilection cohort in accordance with an illustrative embodiment.

FIG. 6 is a flowchart of a process for generating a predilection score for a predilection cohort in accordance with an illustrative embodiment. The process in FIG. 6 may be implemented by software for generating a predilection risk score for a predilection cohort, such as inference engine 326 in FIG. 3. The process begins by determining whether digital sensor data including metadata describing attributes associated with a predilection cohort is received (step 602). If no digital sensor data is received, the process returns to step 602. When digital sensor data is received at step 602, the inference engine processes and parses the digital sensor data using a set of data models to identify a set of events associated with the predilection cohort (step 604). The inference engine analyzes the set of events and the description data for an identified member of the predilection cohort to generate a predilection score (step 606). The inference engine makes a determination as to whether the predilection score exceeds a threshold (step 610). If the predilection score does not exceed the threshold, the process returns to step 602. Returning to step 610, if the score exceeds the threshold, the inference engine identifies the potential action as an action that is likely to occur (step 612) with the process terminating thereafter.

Figure 7:
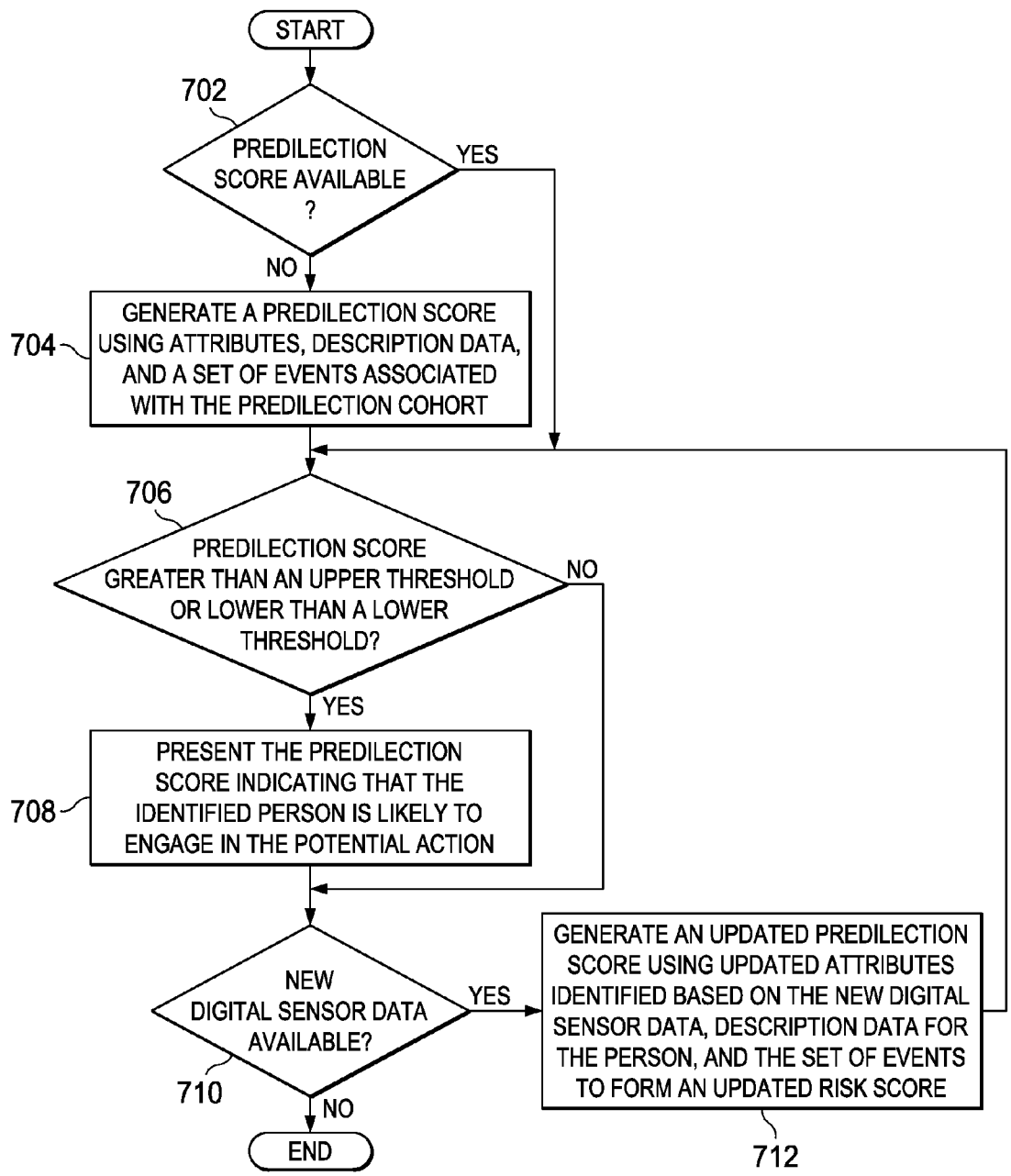
FIG. 7 is a flowchart of a process for comparing a predilection score with a threshold in accordance with an illustrative embodiment.

Turning now to FIG. 7, a flowchart of a process for initiating a response action if a risk score exceeds a risk threshold is shown in accordance with an illustrative embodiment. The process in FIG. 7 may be implemented by software for generating a risk score and initiating an action if the risk score falls below a threshold, such as inference engine 326 in FIG. 3. The process makes a determination as to whether a predilection score for a predilection cohort is available (step 702). If a predilection score is not available, the process generates a predilection score using attributes, description data, and a set of events associated with the predilection cohort (step 704). After either steps 702 or 704 have obtained a predilection score, the process determines whether the predilection score is greater than an upper threshold or whether the predilection score is lower than a lower threshold (step 706). In response to determining that the predilection score is either greater than the upper threshold or lower than the lower threshold, the process presents the predilection score indicating that the identified person is likely to engage in the potential action (step 708).

Returning to step 706, if the predilection score is not greater than an upper risk threshold or lower than a lower threshold at step 706 or after presenting the predilection score indicating that the identified person is likely to engage in the potential action at step 708, the process makes a determination as to whether new digital sensor data is available (step 710). If new digital sensor data is available, the inference engine generates an updated predilection score using updated attributes and an updated set of events identified based on the new digital sensor data to form an updated predilection score (step 712). The process then returns to step 706 and continues processing steps 706-712 iteratively until no new digital sensor data is available. When new digital sensor data is not available at step 710, the process terminates thereafter.

In this example, the threshold includes both an upper threshold and a lower threshold. However, the embodiments are not limited to a single upper threshold and a single lower threshold. The embodiments may use only a lower threshold, utilize only an upper threshold, or utilize a series of thresholds. For example, the initial predilection score may be compared to a first threshold. In response to receiving new digital sensor data, a second predilection score may be generated. The second predilection score may then be compared to a second risk score. In response to new digital sensor data, a third general predilection score may be generated that is compared to a third threshold, and so forth iteratively for as long as new sensor data is available.

As shown here, the identified member of the predilection cohort is a person. However, the identified member of the predilection cohort may be an animal, a plant, or a thing. For example, the predilection score may indicate whether a tree will yield a particular amount of fruit or indicate whether a greyhound racing dog will win a race.

According to one embodiment of the present invention, a computer implemented method, apparatus, and computer program product for generating a predilection score is provided. The process receives digital sensor data associated with a predilection cohort from a set of multimodal sensors. The predilection cohort comprises an identified member of the predilection cohort. The digital sensor data comprises metadata describing attributes of the identified member. The digital sensor data is processed and parsed using a set of data models to identify a set of events associated with the predilection cohort. An inference engine analyzes the set of events and description data for the identified member to generate a predilection score. The inference engine analyzes the set of events and the description data using a rule set. The predilection score indicates a probability of a future occurrence of the potential action being performed by the identified cohort member. In response to a determination that the predilection score exceeds a threshold, the potential action is identified as an action that is likely to occur.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of generating a predilection cohort, the computer implemented method comprising:

receiving digital sensor data associated with a predilection cohort from a set of multimodal sensors, wherein the predilection cohort comprises an identified member of the predilection cohort, and wherein the digital sensor data comprises metadata describing attributes of the identified member;

processing and parsing the digital sensor data using a set of data models to identify a set of events associated with the predilection cohort;

analyzing, by an inference engine, the set of events and description data for the identified member, to generate a predilection score, wherein the inference engine analyzes the set of events and the description data using a rule set, and wherein the predilection score indicates a probability of a future occurrence of the potential action being performed by the identified cohort member; and responsive to a determination that the predilection score exceeds a threshold, identifying the potential action as an action that is likely to occur.

2. The computer implemented method of claim 1 wherein the set of events comprises at least one of past events, current events, and current circumstances associated with members of the predilection cohort.

3. The computer implemented method of claim 1 further comprising:

receiving a query, by the inference engine, wherein the query comprises an identification of the potential action and the description data for the identified member.

4. The computer implemented method of claim 1 further comprising:

analyzing the set of events and the description data to identify the potential action from a set of potential actions.

5. The computer implemented method of claim 1 wherein the occurrence of the potential action comprises at least one of beginning performance of an action, continuing performance of the action, ceasing to perform the action or refraining from beginning to perform the action.

6. The computer implemented method of claim 1 further comprising:

receiving sensor data in an analog format from a set of multimodal sensors associated with a subject; and converting the sensor data from the analog format into a digital format and processing the sensor data to form the digital sensor data.

7. The computer implemented method of claim 1 wherein the description data for the identified subject comprises data describing at least one of a previous history of the identified member, a current status of the identified member, an identification data for the identified member.

8. The computer implemented method of claim 1 further comprising:

responsive to a determination that the predilection score fails to exceed a threshold, receiving the digital sensor data associated with the predilection cohort from the set of multimodal sensors and analyzing the digital sensor data for changes in the attributes and changes in the set of events;

responsive to a determination that new digital sensor data associated with the predilection cohort is available, receiving the new digital sensor data, wherein the new digital sensor data comprises updated metadata describing updated attributes associated with the predilection cohort; and generating an updated predilection score for the predilection cohort based on the description data for the identified member, the set of events, and the updated attributes.

9. The computer implemented method of claim 1 wherein the threshold comprises an upper threshold and a lower threshold, and wherein the predilection score exceeds the threshold if the predilection score exceeds the upper threshold, and wherein the predilection score exceeds the threshold if the predilection score is less than the lower threshold.

10. The computer implemented method of claim 1 wherein receiving the digital sensor data associated with the predilection cohort from the set of multimodal sensors further comprises:

receiving cohort data for a set of multimodal cohorts, wherein the cohort data comprises metadata describing attributes of members of the set of multimodal cohorts; and generating the predilection score for the predilection cohort based on the set of events, the attributes associated with the set of multimodal cohorts, the attributes associated with the predilection cohort, and the description data, wherein the set of multimodal cohorts comprises at least one of a video cohort, an audio cohort, an olfactory cohort, a biometric cohort, a furtive glance cohort, and a sensor and actuator cohort.

11. The computer implemented method of claim 1 further comprising:

generating the predilection cohort, wherein generating the predilection cohort comprises:

receive manual input from a user; and analyzing the digital sensor data using the manual input and at least one of cohort criteria, cohort constraints, a set of data models, and sensor patterns, by a cohort generation engine.

12. The computer implemented method of claim 1 wherein the set of multimodal sensors comprises at least one of a set of chemical sensors, a set of audio sensors, a set of cameras, a set of biometric sensors, and a set of sensors and actuators.

13. A computer program product for generating a predilection cohort, the computer program product comprising:

a computer usable medium having computer usable program code embodied therewith, the computer usable program code comprising:

computer usable program code configured to receive digital sensor data associated with a predilection cohort from a set of multimodal sensors, wherein the predilection cohort comprises an identified member of the predilection cohort, and wherein the digital sensor data comprises metadata describing attributes of the identified member;

computer usable program code configured to process and parse the digital sensor data using a set of data models to identify a set of events associated with the predilection cohort;

computer usable program code configured to analyze, by an inference engine, the set of events and description data for the identified member, to generate a predilection score, wherein the inference engine analyzes the set of events and the description data using a rule set, and wherein the predilection score indicates a probability of a future occurrence of the potential action being performed by the identified cohort member; and computer usable program code configured to identify the potential action as an action that is likely to occur in response to determination that the predilection score exceeds a threshold.

14. The computer program product of claim 13 wherein the set of events comprises at least one of past events, current events, and current circumstances associated with members of the predilection cohort.

15. The computer program product of claim 13 further comprising:

computer usable program code configured to receive a query, by the inference engine, wherein the query comprises an identification of the potential action and the description data for the identified member.

16. The computer program product of claim 13 wherein the description data for the identified subject comprises data describing at least one of a previous history of the identified member, a current status of the identified member, an identification data for the identified member.

17. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to receive digital sensor data associated with a predilection cohort from a set of multimodal sensors, wherein the predilection cohort comprises an identified member of the predilection cohort, and wherein the digital sensor data comprises metadata describing attributes of the identified member, process and parse the digital sensor data using a set of data models to identify a set of events associated with the predilection cohort, analyze, by an inference engine, the set of events and description data for the identified member, to generate a predilection score, wherein the inference engine analyzes the set of events and the description data using a rule set, and wherein the predilection score indicates a probability of a future occurrence of the potential action being performed by the identified cohort member, and identify the potential action as an action that is likely to occur in response to determination that the predilection score exceeds a threshold.

18. The apparatus of claim 17 wherein the set of events comprises at least one of past events, current events, and current circumstances associated with members of the predilection cohort.

19. The apparatus of claim 17 wherein the description data for the identified subject comprises data describing at least one of a previous history of the identified member, a current status of the identified member, an identification data for the identified member.

20. A data processing system comprising:
a sensor analysis engine, wherein the sensor analysis engine receives digital sensor data associated with a predilection cohort from a set of multimodal sensors, wherein the predilection cohort comprises an identified member of the predilection cohort, and wherein the digital sensor data comprises metadata describing attributes of the identified member; processes and parses the digital sensor data using a set of data models to identify a set of events associated with the predilection cohort; and
an inference engine, wherein the inference engine analyzes the set of events and description data for the identified member, to generate a predilection score, wherein the inference engine analyzes the set of events and the description data using a rule set, and wherein the predilection score indicates a probability of a future occurrence of the potential action being performed by the identified cohort member, and wherein the inference engine identifies the potential action as an action that is likely to occur in response to determination that the predilection score exceeds a threshold.

* * * * *